W. W. COOK.
VEHICLE.
APPLICATION FILED NOV. 3, 1908.
916,272.
Patented Mar. 23, 1909.
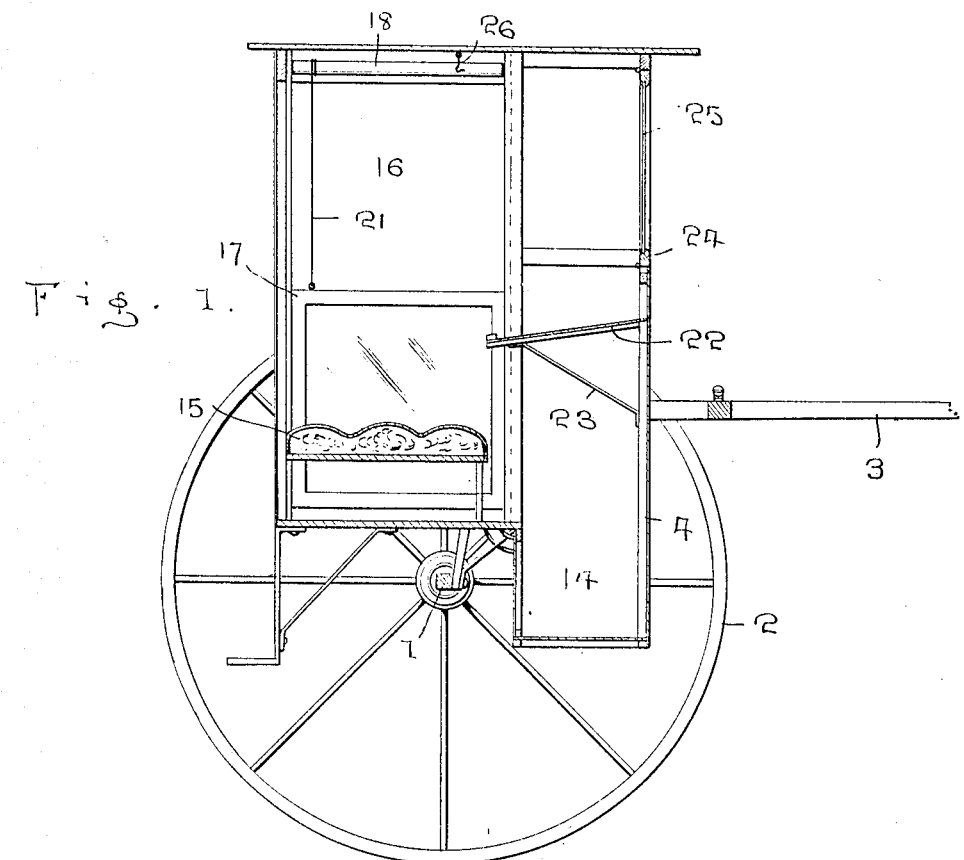
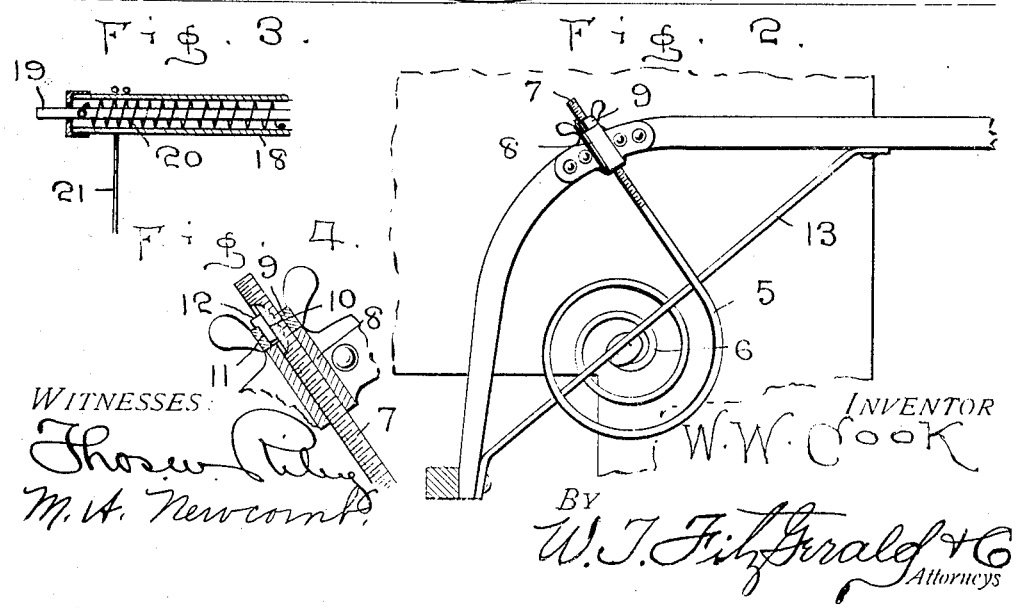
WITNESSES:
INVENTOR
W. W. Cook
BY
W. J. FitzGerald & Co.
Attorneys

UNITED STATES PATENT OFFICE.

WESLEY W. COOK, OF FORT RIPLEY, MINNESOTA.

VEHICLE.

No. 916,272.       Specification of Letters Patent.       Patented March 23, 1909.

Application filed November 3, 1908. Serial No. 460,914.

*To all whom it may concern:*

Be it known that I, WESLEY W. COOK, a citizen of the United States, residing at Fort Ripley, in the county of Crow Wing and State of Minnesota, have invented certain new and useful Improvements in Vehicles; and I do hereby declare the following to be a full, clear, and exact description of the invention, such as will enable others skilled in the art to which it appertains to make and use the same.

My invention relates to new and useful improvements in vehicles and more particularly to that class adapted to be used by rural mail carriers in collecting and distributing mail and my object is to provide means for mounting a bed on a two-wheeled vehicle.

A further object is to provide means for adjusting the equilibrium of the bed when two or more persons of different weights are riding therein.

A still further object is to so arrange the hangers employed for supporting the bed on the vehicle frame as to compensate for the movement caused by the draft animal when traveling.

A still further object is to provide suitable openings in the side of the vehicle body, whereby the mail may be distributed or collected without dismounting from the vehicle.

A still further object is to provide suitable closures for said openings and a still further object is to provide means for raising said closures and holding the same in their elevated position when desired.

Other objects and advantages will be hereinafter referred to and more particularly pointed out in the claims.

In the accompanying drawings which are made a part of this application, Figure 1 is a transverse vertical sectional view through a two-wheeled vehicle, showing my improved attachments applied thereto. Fig. 2 is a detail elevation showing the manner of mounting the vehicle body to the running gears of the vehicle. Fig. 3 is a detail sectional view of a roller employed for supporting the closures for the side openings in the vehicle body, and, Fig. 4 is a detail sectional view showing the manner of attaching one end of the body hanger to the shaft of the vehicle.

Referring to the drawings in which similar reference numerals designate corresponding parts throughout the several views, 1 indicates the axle of my improved vehicle, on each end of which is mounted a supporting wheel 2, and secured to the axle 1 are the usual or any preferred form of shafts 3.

Mounted above the axle 1 and between the rear ends of the shafts 3, is the body 4 of the vehicle and in order to suspend the body above the axle, and provide spring supports therefor, I have provided hangers 5, the lower ends of which are formed into a spiral 6, the free end of the spiral portion being secured in any preferred manner to the body 4, while the opposite end of the hanger is formed into a shank 7, which is threaded and entered through a socket 8 fixed to the shaft 3, the threaded portion of the shank being engaged by a wingnut 9, whereby said shanks may be adjusted longitudinally to increase or decrease the tension of the spring portion of the hangers and adjust the body 4 above the axle. The nut 9 is held in its adjusted position by providing the shank 7 with a longitudinally extending groove 10, with which is adapted to register a similar groove 11 in the nut and when the tension of the spring has been properly adjusted, the two grooves 10 and 11 are brought into registration with each other and the key 12 inserted therein, said key holding the nut against further rotation until such time as it is again desired to adjust the hanger. The body 4 is held against undue lateral movement by extending brace rods 13 between the coils of the spirals 6, said rods being fixed to the shafts and extending from the lower ends of the shafts to the horizontal portions thereof, said rods being employed for bracing the bowed portions of the shafts and as the ends of the spirals are fixed to the body at a point to intersect the braces in their length, the brace rods will pass through the spirals at a point to intersect the axial centers of the spirals and by introducing the brace rods between the coils of the spirals and preferably the coils adjacent the shanks, the tension of the remainder of the springs will be employed for holding the body against undue lateral swinging movement. A further object in providing the hangers with spiral terminals as shown, is to overcome the movement occasioned by the draft animal and it will be readily seen that by suspending the body as shown, the coiled portions of the hangers will yield to the movement occasioned by the draft animal, while the body 4 will be held against undue movement.

The forward portion of the body 4 is provided with a depending extension 14, said extension being preferably located forward of the axle 1, while that portion of the body immediately over the axle is provided with a seat 15 and when the seat is occupied, the parts are so arranged that the feet of the occupant will extend into the extension 14. That portion of the body containing the seat 15 is provided at each side with openings 16, through which the occupant of the vehicle may reach to collect or deposit mail, said openings being adapted to be closed by means of sashes 17, in which are placed any suitable transparent substance, such as glass, mica, or the like, or, if preferred, the sash may be covered with canvas. The sashes are slidably mounted in grooves formed in the frame of the body and are normally held in their elevated positions or over the openings 16 by suspending the sash from rollers 18, said rollers being preferably hollow and rotatably mounted on rods 19, the ends of which rods are fixed to the frame portion of the body 4 and at a point above the openings 16, a spring 20 being entered in the roller and surrounding said rods, one end of the spring being secured to the roller, while the opposite end thereof is secured to the rod 19. A cord 21 is extended from the rollers 18 to the sash 17 and by providing but one cord for each sash and placing the same adjacent one edge of the sash, said sash will be caused to bind in the grooves in which they are mounted and thereby hold the sash in its lowered position. This manner of applying the cords is in view of the fact that the springs within the rollers are at all times exerting tension on the rollers and would immediately elevate the sash if some means were not provided for locking the sash in their lowered positions and it will be readily seen that when it is desired to elevate the sash, a slight downward pressure on the sash immediately adjacent the connection of the cord with the sash, will bring the sash to a proper level in its grooves and in which event the sash will be immediately elevated by the rotation of the rollers.

It is frequently necessary to assort mail during the trip and in order to provide a convenient rest for the mail matter, while being assorted, a shelf 22 is extended rearwardly a suitable distance from the forward wall of the body 4 and is preferably slightly inclined, said shelf being held firmly in position by means of a bracket 23.

The forward wall of the body 4 is also provided with a swinging closure 24, in which is placed any suitable form of transparent material 25, so that the occupant of the vehicle will have a clear view forwardly of the vehicle and by hinging the closure at its upper edge, the same may be elevated and secured in its elevated position by means of a hook 26, suspended from the top of the body.

Entrance to the body 4 is had from the rear of the vehicle and any suitable form of door may be provided at this point, or a canvas may be fixed to the roof of the body and secured over the opening in the rear portion of the body in any suitable manner and it will be clearly understood that when the canvas is used, it may be rolled up and secured in its rolled position at any time desired.

It will thus be seen that I have provided a very cheap and economical form of vehicle and one wherein the motion occasioned by the travel of the animal, will be arrested before reaching the body of the vehicle. It will further be seen that by providing adjustable hangers for the body, said hangers may be readily adjusted to maintain the body at the proper level under all conditions and, furthermore, that by arranging parts of the hangers as described, undue lateral movement of the body will be prevented.

What I claim is:

1. In a vehicle of the class described, the combination with an axle, shafts secured to said axle and brace rods fixed to said shafts; of a body between said shafts, hangers for said body, one end of said hangers being spirally disposed and fixed to the body and the opposite ends of said hangers terminating in shanks, sockets carried by the shafts, through which said shanks extend and wing nuts engaging the free ends of the shanks above the sockets, whereby said hangers may be adjusted.

2. In a vehicle of the class described, the combination with an axle and shafts secured to said axle; of a body between said shafts, hangers for said body, the lower ends of said hangers terminating in spirally disposed springs and the upper ends thereof formed into shanks, said shanks having grooves therein, sockets carried by said shafts, through which said shanks extend and nuts adapted to engage the ends of the shanks above the sockets, said nuts having grooves therein adapted to register with the grooves in the shanks and a key adapted to be disposed into said grooves.

3. In a vehicle of the class described, the combination with an axle, shafts fixed to said axle and brace rods secured to said shafts; of a body between said shafts, hangers for said body, the lower ends of said hangers being formed into coil springs, the free end of the coil portions engaging the body, the brace rod on the shafts extending between two coils of the springs, shanks at the opposite ends of the hangers, said shanks being threaded, sockets carried by the shafts, through which the threaded ends of the shanks extend and nuts adapted to engage said threaded shanks above the sockets.

In testimony whereof I have signed my name to this specification in the presence of two subscribing witnesses.

WESLEY W. COOK.

Witnesses:
W. M. RAIL,
A. L. BENNETT.